UNITED STATES PATENT OFFICE.

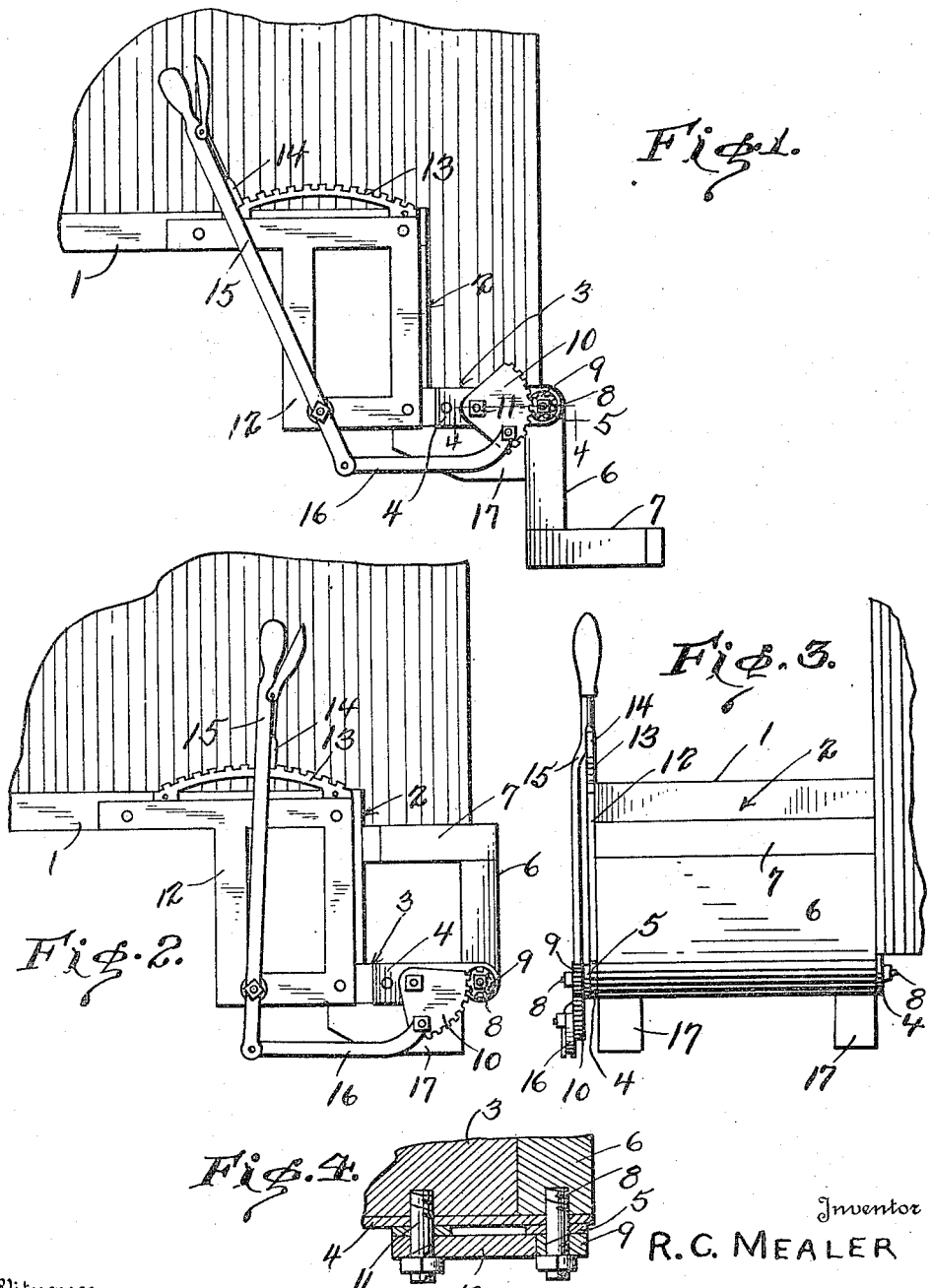

ROBERT C. MEALER, OF COLORADO SPRINGS, COLORADO.

FOLDING CAR-STEP.

1,193,466.     Specification of Letters Patent.     Patented Aug. 1, 1916.

Application filed September 25, 1915, Serial No. 52,633. Renewed June 29, 1916. Serial No. 106,729.

*To all whom it may concern:*

Be it known that I, ROBERT C. MEALER, a citizen of the United States, residing at Colorado Springs, in the county of El Paso, State of Colorado, have invented certain new and useful Improvements in Folding Car-Steps; and I do hereby declare the following to be a full, clear, and exact description of the invention, such as will enable others skilled in the art to which it appertains to make and use the same.

The present invention is directed to improvements in folding car steps, and has for its object to provide a device of this character which may be readily attached to the lower steps of the usual car step.

A further object of the invention is to provide a step of this character so constructed that the same can be folded when not in use, and lowered in close proximity to the platform for the convenience of passengers upon entering or leaving the car.

With these and other objects in view, this invention resides in the novel features of construction, formation, combination and arrangement of parts to be hereinafter more fully described, claimed and illustrated in the accompanying drawing, in which:

Figure 1 is a side elevation of the device when in its unfolded position. Fig. 2 is a similar view of the device in its folded position. Fig. 3 is a front view of the step in its folded position. Fig. 4 is a sectional view on line 4—4 of Fig. 1.

Referring to the drawing 1 indicates the car platform and 2 the usual steps. Fixed to the ends of the tread 3 of the steps 2 are plates 4, which have their outer end extending beyond the forward edge of the tread 3, and are provided with bearings 5, the purpose of which will later appear.

The folding step comprises a riser 6, and a tread 7, said riser having fixed in its ends shafts 8 which engage the bearings 5 of the plates 4. One of the shafts has fixed thereto a pinion 9, which is in mesh with the teeth of the segment 10, which is pivotally connected to the tread 3 by the stub shaft 11.

A rectangular frame 12 is supported by the steps 2, and has associated with its upper end a rack segment 13 which coöperates with the spring pressed pawl 14 carried by the operating lever 15, said lever being pivotally connected to the lower bar of the frame 12. Having its inner end connected to the lower end of the lever is a link 16, the outer end of which is pivotally connected to the segment 10 and eccentrically thereto, whereby when said lever is moved forwardly the folding step will be moved to its inoperative position, and when moved rearwardly said step will be lowered, the downward swinging movement of the folding step being limited when the riser 6 engages the cleats 17 fixed to the lower surface of the tread 3 of the usual steps.

It will be noted that the tread 7 of the folding step is of greater width than the riser 6 thereof, so that when the step is in its folded position the weight of the tread will be sufficient to prevent movement of the folding step incident to the swaying movement of the car when in motion, thus relieving strain upon the operating lever and its associated parts.

What I claim is:

The combination with the steps of a car, of a folding step having its riser pivotally supported by the usual steps, a pinion carried by one of the pivotal connections of the riser, a stub shaft carried by the car steps, and having a toothed segment carried thereby adapted to mesh with said pinion, an operating lever associated with the car steps, a link having its inner end connected to the lever and its outer end pivoted eccentrically of the segmental plate, whereby when said lever is shifted the segment will be operated to fold or unfold the folding step.

In testimony whereof, I affix my signature, in the presence of two witnesses.

ROBERT C. MEALER.

Witnesses:
  GEORGE HOWARD,
  LENNA GATES.

Copies of this patent may be obtained for five cents each, by addressing the "Commissioner of Patents, Washington, D. C."